April 22, 1930.　　　P. L. SCOTT　　　1,755,192
ATOMIZING VALVE
Filed Dec. 14, 1925
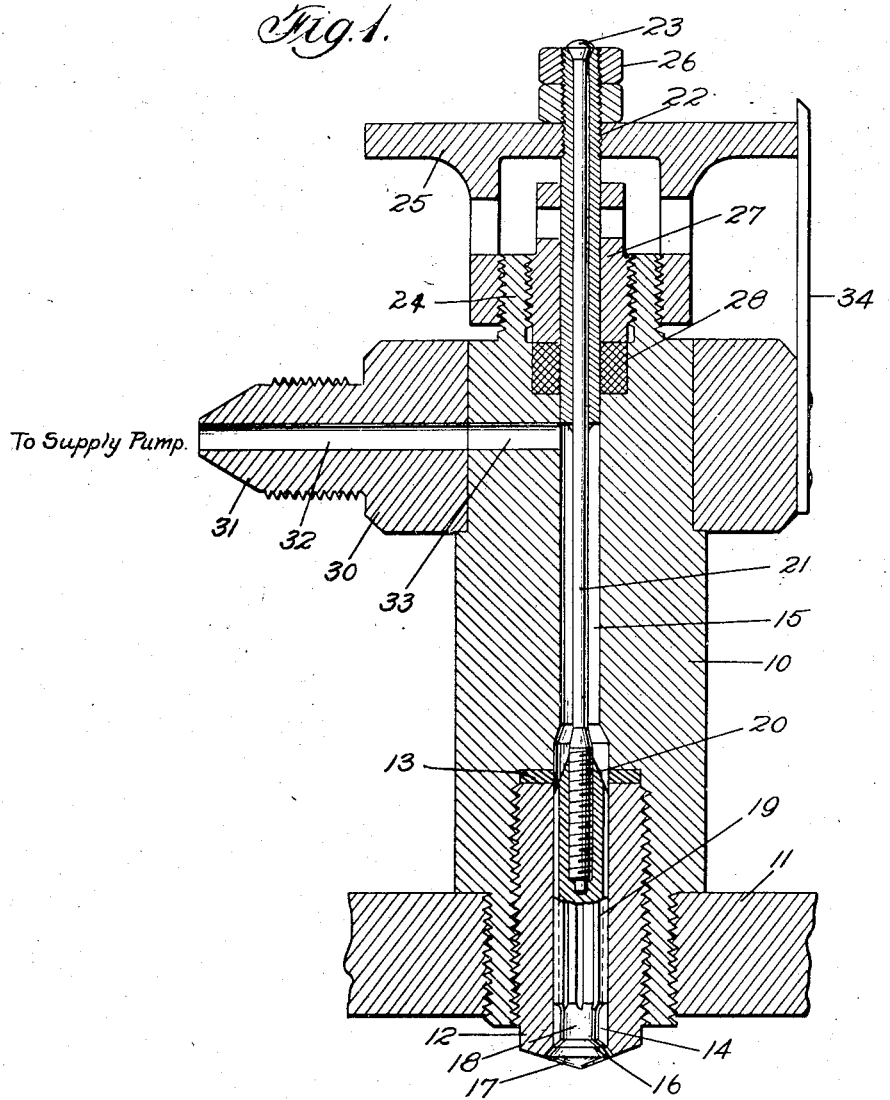
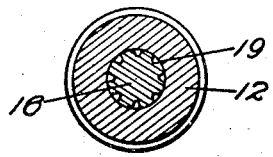
Inventor
Philip Lane Scott.
By Parker & Carter
Attorney Patented Apr. 22, 1930

1,755,192

UNITED STATES PATENT OFFICE

PHILIP LANE SCOTT, OF CHICAGO, ILLINOIS, ASSIGNOR TO SUPER-DIESEL TRACTOR CORPORATION, OF LA PORTE, INDIANA, A CORPORATION OF NEW YORK

ATOMIZING VALVE

Application filed December 14, 1925. Serial No. 75,661.

The present invention relates to injection valves particularly adapted for use in a system of direct or solid fuel injection for internal combustion engines; i. e., a system in which liquid fuel, such as oil, is pulverized and sprayed into a combustion chamber without the use of compressed air.

To secure a sufficient degree of pulverization in systems of this type, it is necessary that the fuel be supplied through a small aperture at very high pressure and very high velocity; and it has been a defect, generally speaking, of the engines of this type which have heretofore been proposed, that the pressure at which the fuel is supplied has not been carried to or consistently maintained at the point necessary to properly atomize the fuel.

If an engine of this type is to operate on the Diesel cycle, as is usually the case, the rate of injection of the fuel must vary. If this varying fuel feed is supplied to the combustion chamber through a valve opening of fixed size, the pressure and velocity may be too low at the beginning of the injection, reach a dangerously high point during the maximum rate of injection, and drop to a point below that necessary to properly atomize the fuel at the end of the injection. It is, consequently, of great importance to provide an injection system in which the size of the opening is constantly proportional to the desired rate of injection, so that the pressure and velocities may remain constant during the entire period of injection, or substantially so.

It is further of importance to so construct the injection valve that the maximum surface of the pulverized fuel shall constantly be presented to a fresh portion of the air compressed within the combustion chamber.

These several objects may be achieved, as pointed out in my Patent No. 1,595,625, Aug. 10, 1926, by forcing the fuel into the combustion chamber under very high pressure through an injection valve or orifice, the opening of which is due to the injection pressure and is opposed by the tensile strength and resistance to linear deformation of a valve-retaining member made of metal, such as steel, having good tensile strength and such elasticity that the high pressures of injection are well within the limit of elasticity of the metal.

There is provided a valve consisting of an oil inlet leading into a hollow chamber in a body or casing, at the lower end of which is a valve seat adapted to receive a valve head and stem, the latter may be fluted to permit the passage of the fuel to the valve seat. The valve is maintained in a closed position by a straight piece of wire under direct tension and acting as a spring, the tension of which may be adjusted by suitable devices. The construction is such that the liquid fuel supplied at high pressure will act upon the valve to open the same by elongating the wire to which it is connected, the elongation being slight, but sufficient to cause the fuel to be injected into the cylinder of the engine in the form of a spray presenting the maximum surface of the fuel to the action of the charge of air in the cylinder.

The particular nature of the present invention, as well as other advantages thereof, will appear more clearly from a description of a preferred embodiment as shown in the accompanying drawings, in which Figure 1 is an elevation in central section of the entire valve, and Fig. 2 is a cross section through the lower end of the valve along the line 2—2 of Fig. 1.

In the drawing, 10 designates the body of the injection valve, which is screwed into the wall of the cylinder 11. Within the lower end of the body 10 is inserted a plug 12 formed of hardened tool steel, a washer 13 being provided at the inner end of the plug to form a tight joint. The plug is provided with a central bore 14 which registers with a corresponding bore 15 in the body 10. The lower edge of the bore in the plug 12 is bevelled as at 16 to form a valve seat, and a valve head 17 formed at the lower end of a valve stem 18 co-operates with the valve seat. In order to hold the valve stem in proper central position in the bore within the plug 12, the stem may be fluted as at 19 for the greater part of its length. The upper end of the valve stem is tapered as at 20 to aid in conducting the fluid toward the grooves in the fluted periphery of the stem.

Screwed into the upper end of the valve stem is one end of a rod 21, which is here shown in the form of a cold-drawn steel bicycle spoke, although any other suitable kind of rod may be employed. This rod extends through the bore 15 and is surrounded at its upper end by a fastening sleeve 22, the enlarged head 23 of the rod being set in a recess at the upper end of the sleeve. The upper end of the body portion 10 is formed with an upstanding annular portion 24 which is screw-threaded on the outside to receive a supporting nut 25 provided with an aperture through which the rod 21 and the fastening sleeve 22 extend, and against the upper face of which the rod and sleeve are held by lock nuts 26. The upstanding portion 24 is interiorly threaded to receive a gland 27 which holds in place a packing 28, the latter and the gland constituting a stuffing box for preventing leakage of the fuel at the top of the device.

Surrounding the top of the body portion 10 is an annular member 30 provided with a projection 31 adapted to be connected to a suitable pump for supplying the fuel to the valve, a bore 32 being provided in the projection 31 and registering with a bore 33 in the body of the valve communicating with the central bore 15. Attached to the annular member 30 is a pointer 34, the upper end of which is in contact with the periphery of the supporting nut 25, it being intended that the latter shall be provided with suitable graduations adapted to co-operate with the pointer 24 to indicate the tension of the rod 21, and hence the pressure which must be reached before the valve 17 will open.

In the operation of the injection valve described above, the pump will supply fuel through the bores in the device. At the beginning of the discharge stroke of the pump, the pressure in the entire system rises until it overcomes the tension of the rod 21 that holds the valve 17 against its seat 16. The elongation of the rod 21, under the pressure of the fuel, will permit only a small aperture between the valve head and its seat. In practice, this may amount to only one or two ten thousandths of an inch. It is evident that when the valve is on its seat, the pressure of the fuel is exerted on the inside of the valve head over an area having for its limit, the inner diameter of the valve seat while after the valve has opened the area on which the fuel may exert pressure is increased to one having the outer diameter of the valve seat as its limit.

I have shown and described a valve embodying my invention as constituting an element of a fuel injection system for an internal combustion engine. It will be understood however that this particular use of the invention is chosen merely for purposes of illustration and an understanding of the nature and operation thereof, and that the valve illustrated, practically without change or modification, could be put to other uses, as for instance as an element in a system for atomizing liquids other than fuel intended to be burned in an internal combustion engine.

I claim:

In a direct fuel injection system for internal combustion engines, an injection valve comprising a valve housing and a valve seat, and a valve member adapted to be seated upon such seat, a valve retainer comprising a metal rod firmly holding the valve member upon its seat, said retainer adapted to be elongated by pressure within the valve housing to permit opening of the valve, the valve member being removably attached to said rod and provided with a plurality of elongated guiding elements, such guiding elements being separated from each other and providing passages of restricted cross sectional areas.

Signed at Chicago, county of Cook, and State of Illinois, this 4th day of December, 1925.

PHILIP LANE SCOTT.